G. A. BURNHAM.
MOTOR STARTING DEVICE.
APPLICATION FILED AUG. 2, 1918.

1,415,521. Patented May 9, 1922.
2 SHEETS—SHEET 1.

Inventor,
George A. Burnham
by
B. J. Noyes atty

UNITED STATES PATENT OFFICE.

GEORGE A. BURNHAM, OF SAUGUS, MASSACHUSETTS, ASSIGNOR TO SEARS B. CONDIT, JR., OF BROOKLINE, MASSACHUSETTS.

MOTOR-STARTING DEVICE.

1,415,521.  Specification of Letters Patent.  Patented May 9, 1922.

Application filed August 2, 1918. Serial No. 247,975.

*To all whom it may concern:*

Be it known that I, GEORGE A. BURNHAM, a citizen of the United States, residing in Saugus, in the county of Essex and State of Massachusetts, have invented an Improvement in Motor-Starting Devices, of which the following is a specification.

My invention relates to induction motors, and has more particular reference to means for starting induction motors.

In the operation of induction motors, and especially of the larger sizes, it is well known that it is not advisable to connect said motors initially directly to the power circuit because of the excessive starting current taken from the system while they are being brought to normal speed; and it is therefore customary to employ starting or auto transformers, the auto-transformers being more commonly used. Said transformers are arranged to be initially connected between the line or power circuit and the motor, and serve to reduce the voltage applied to the terminals of the motor, in the operation of starting the motor, in order that the current drawn from the line may be kept from rising to an abnormal value. A double throw switch is customarily employed in connection with the starting transformer and motor, one side of which serves to connect the motor to the line or power circuit through the starting transformer, and the other side of which serves to connect the motor directly to the line.

The starting transformer, considering particularly the case of a three phase line, has its coils permanently connected in Y or V, and taps are extended from the ends of the coils for connection through the switch with the line. Other taps are brought out from intermediate points of the coils for connection through the switch with the motor, to provide a low voltage for the starting of the motor.

The double throw switch employed in connection with such a starting transformer has six poles, which, with the transformer connections above described, is the minimum number of poles that can be employed and the switches must be of special construction.

The object of my invention is the provision of a system of connection between the coils of the starting or auto-transformer, the motor and the starting switch, whereby a single so-called standard type of switch commonly employed for various purposes, may be employed for the control of an induction motor without materially changing the construction of the switch.

Instead of permanently joining together ends of the auto-transformer coils, for the purpose of obtaining the desired Y or V scheme of connections, depending upon whether the transformer has three or two coils, I prefer to extend leads from all ends of the coils to the switch, and complete the transformer connections through the switch. I extend other leads from taps connected to intermediate points of the starting transformer coils to the motor, which leads are arranged to be permanent and in which no switch contacts are arranged.

With the arrangement above described, the double throw switch must be provided with three poles to provide for connections between the three wires composing the line, and the transformer on one side, and the motor on the other, and one pole in addition, through which connection is made between the ends of the transformer coils, which is equivalent to the permanent junction heretofore always made between the coils in the auto-transformer.

A double throw four pole switch is therefore all that is necessary in order to adequately control the motor with the above described connections, and such a switch is a so-called standard type.

A much more compact combination of auto-transformer and switching equipment is possible by this arrangement of connection by which it is possible to employ a four pole switch, than by the usual scheme of connection, which necessitated the use of a six pole double throw switch, and, for high voltage apparatus, permits a much greater spacing between poles of the switch and yet is more compact than is possible with the six pole switch and therefore provide for a greater margin of safety.

Figure 1:
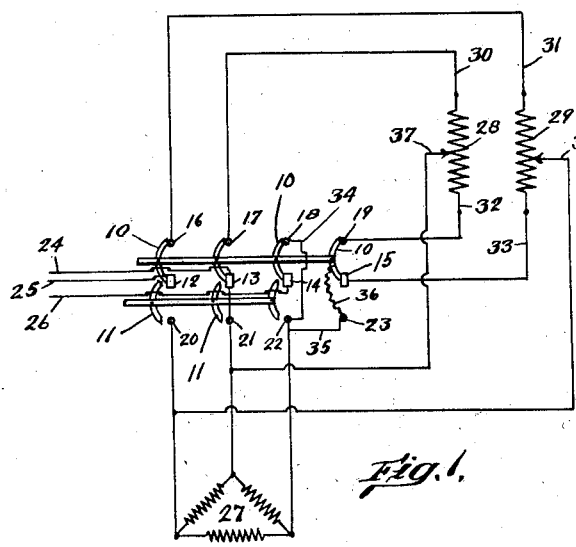
Fig. 1 represents the connections embodying my invention, between a four pole double throw switch, a two coil auto-transformer and an induction motor adapted for connection to a three-phase line.

Fig. 1 shows the scheme of connection between a four pole double throw switch, an induction motor and a two coil auto-transformer or compensator arranged to control a motor, associated with a three phase line. The switch includes four starting switch members or brushes 10 and three running switch members or brushes 11. Said brushes 10 are connected together for conjoint movement and said brushes 11 are also connected together for conjoint movement as is well known. The switch is provided with four intermediate stationary members 12, 13, 14, and 15; a set of four stationary contact members 16, 17, 18 and 19 arranged on the starting side of the switch; and four stationary contact members 20, 21, 22, and 23 arranged on the running side of the switch. The line wires 24, 25, and 26 are arranged to be connected respectively with the intermediate stationary contact members 12, 13 and 14 of the switch.

The motor 27 is connected through leads to the stationary contact members 20, 21 and 22 on the running side of the switch and is adapted to be in permanent connection therewith. The starting transformer or compensator is provided with two coils 28 and 29, which have terminals 30 and 31 respectively extended from the coils and connected to the stationary switch members 16 and 17, arranged on the starting side of the switch. The other terminals 32 and 33 of the coils, instead of being permanently joined together, as has heretofore been universal practice are separately connected to switch members and the terminals 32 is connected with the switch member 19 on the starting side of the switch and the terminal 33 is connected to the intermediate starting switch member 15 of the switch.

The junction or connection between the ends of the coils is arranged to be made within the switch, as is hereinafter more fully described and it is by causing the connections between the ends of the coils heretofore permanently formed, to be under the control of the switch that a standard four pole switch may be employed.

The lead or jumper 34 is arranged to be connected on the outside of the switch casing between the stationary switch member on the starting side of the motor, and the corresponding stationary switch member 22 on the running side of the switch. A second jumper 35 is bridged across the adjacent stationary switch members 22 and 23 on the running side of the switch.

A flexible lead or strip 36 is arranged within the switch enclosing casing and, as here shown, is connected between the brush 10 and the stationary switch member 23 on the running side of the switch and, through the leads or jumpers 35 and 34, serves to connect said brush with the stationary switch member 18 on the starting side of the switch; which connections are such that when the starting switch is closed, the ends 32 and 33 of the transformer coils are connected together and to the line wire 26. Although the flexible lead 36 is shown connected between said brush 10 and the switch member 23 on the running side of the switch, yet said brush may be connected in other ways with the switch members, as the purpose of such connections is to connect said brush and one of the line wires as 26, when the switch is conditioned for starting. It is preferable, however, to extend the flexible lead 36 between said brush 10 and said member 23 in order that the switch may be adapted for use either with a two coil compensator or with a three coil compensator, whereby the necessary slight alterations in connections may be made between the component parts of the switch extended beyond the switch enclosing casing.

The transformer coils, as is common, are provided with leads 37 and 38 which are extended from intermediate points of said coils to provide a reduced voltage for the starting of the motor and said leads are adapted to be permanently joined to the motor leads.

With the connections shown and described, it is evident that when the switch is moved into the starting position, the ends 30 and 31 of the transformer coils will be connected respectively to the line wires 25 and 24 and that the other ends 32 and 33 of said coils will be joined together within the switch casing by the brush 10 which bridges the stationary switch members 15 and 19 and that said junction will be connected through the flexible lead 36 and external jumpers 35 and 34 with the line wire 26, thus completing the connection between the line and the transformer.

Due to the connections through the low voltage taps 37 and 38 between the motor and compensator, a voltage less than the normal line voltage is impressed upon the terminals of the motor, and the motor consequently begins to rotate. When the motor has reached approximately its normal running speed, the switch may be moved into the running position. In this position the terminals 30 and 31 of the transformer coils are disconnected from the line and the junction between the ends 32 and 33 of said coils, and the connection therewith with the line wire 26 is broken, and the transformer is therefore operatively disconnected from the line.

With the running switch in closed position, the motor leads are directly connected to the line through the running switch members or brushes. The transformer, however, has potential applied to its coils through the permanent connection between the motor leads and the low voltage taps 37 and 38 of the coils. This, however, is of no particular consequence because, as the coils are open ended, there can be no current flow through the coils, and therefore no loss of energy. Moreover, as the starting transformers or compensators are almost universally enclosed in the same casing with the starting switch, there are no exposed terminals or leads which may be energized by this scheme of connection other than the customary line and motor leads.

Figure 2:
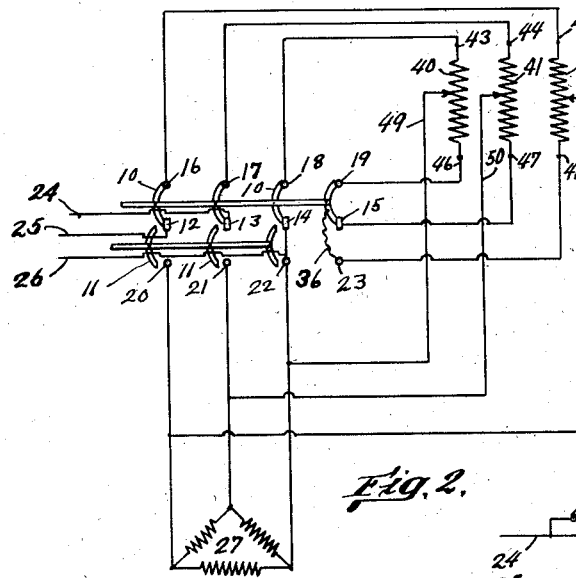
Fig. 2 represents the connections between a four pole double throw switch, a three coil auto-transformer and an induction motor adapted for connection with a three phase line.

Fig. 2 illustrates the principle of the invention as applied to a three coil transformer. In this figure the construction of the four pole double throw switch is as before, and the motor 27 is connected as in Fig. 1, to the stationary switch members 20, 21 and 22 on the running side of the switch. The starting transformer or compensator is provided with three coils 40, 41 and 42, and ends or terminals 43, 44 and 45 are connected respectively to the stationary switch members 16, 17 and 18 on the starting side of the switch. The remaining ends or terminals 46, 47 and 48 of said coils, instead of being permanently connected or joined together, as has heretofore universally been the case, are extended and connected respectively to the stationary switch member 19 on the starting side of the switch, the intermediate stationary switch member 15 and the stationary switch member 23 on the running side of the switch, which terminals are arranged to be joined together within the switch casing when the switch is moved into starting position, in which position the brush 10, bridging the switch members 15 and 19, serves to connect the terminals or ends 46 and 47 of the coils; and since said brush 10 is connected through the flexible lead 36 to the switch member 23, it also serves to connect said terminals 46 and 47 with the terminal 48 of the coil.

Taps 49, 50 and 51 are extended from intermediate points of the coils of the transformer, as is common practice, to provide for a reduced motor starting voltage, and are arranged to be permanently connected with the motor terminals.

When the switch is moved into the starting position, the terminals 43, 44 and 45 of the three coil compensator are connected through the starting brushes 10 with the line wires 24, 25 and 26, and the other ends 46, 47 and 48 of said coils are joined together within the switch casing, as has been previously explained thus forming, under the control of the switch, the standard form of connection between the transformer coils that has heretofore been permanently made at the transformer.

The transformer coils are now energized and a reduced voltage is impressed upon the motor 27 through the intermediate taps 49, 50 and 51 of the coils, and the motor may thereby start to rotate. As before, when the motor has attained substantially normal running speed, the switch is moved into the running position. The transformer terminals are thereby disconnected from the line through the separation of the starting switch members or brushes 10 from the starting switch members of the switch, and the junction between the other ends of said coils made within the switch casing is also broken; and the motor, through the running switch members 11, is directly connected to the line. Potential is applied to the transformer coils as before through the connection between the motor leads and the intermediate or low voltage taps of the coil, but this, as before, is of little consequence, as it is to be understood that all connections between the starting transformer and switch made within the single enclosing casing and there are therefore no lead exposed to be energized, other than the usual line and motor leads, The scheme of connections between the transformer coils and the double throw switch is illustrated more clearly in Figs. 3 to 6 inclusive, which represent the connections between the coils and the line in the starting and running conditions of the switch for a two coil and a three coil transformer.

Figure 3:
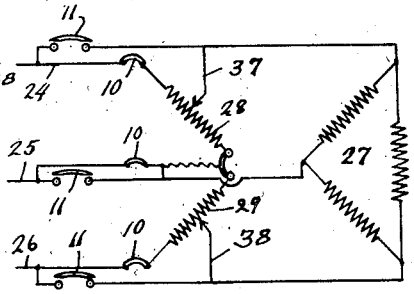
Fig. 3 is a diagrammatic scheme of the connections of Fig. 1, with the switch arranged for the starting of the motor.

Fig. 3 shows the connection between the switch and the two coil transformer arranged for the starting of the motor, in which condition the starting switch members or brushes 10 are closed, and the transformer coils are connected in open delta or V to the line. The motor is shown as permanently connected through the taps 37 and 38 to the coils of the transformer. The running switch members or brushes 11 are in open position and a low starting voltage may therefore be impressed upon the motor.

Figure 4:
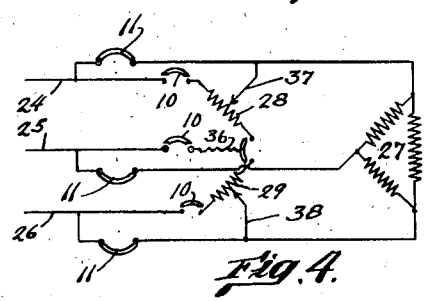
Fig. 4 is a diagrammatic scheme of connections of Fig. 1 with the switch arranged for the running of the motor.

Fig. 4 shows the arrangement of the switches and coils of the two coil transformer, arranged for the running of the motor, in which case the starting switch members or brushes 10 are in open position and the running switch members or brushes 11 are in closed position and the ends of the coils are disconnected from each other and from the line.

Figure 5:
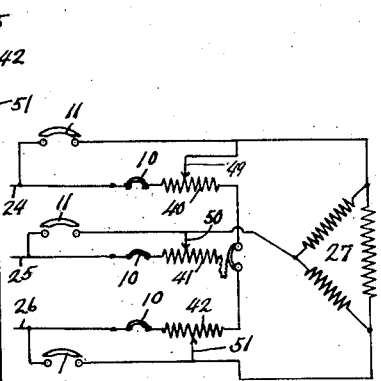
Fig. 5 is a diagrammatic scheme of the connections of Fig. 2 with the switch arranged for the starting of the motor.

Fig. 5 represents the scheme of connection with a three coil transformer in which the starting switch members or brushes 10 are closed, and the running switch members or brushes 11 are open and the transformer is connected in Y for the starting of the motor.

Figure 6:
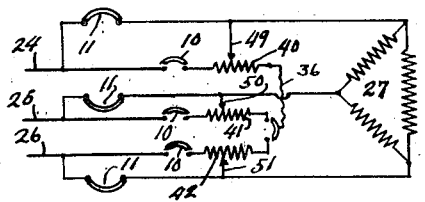
Fig. 6 is a diagrammatic scheme of the connections of Fig. 2 with the switch arranged for the running of the motor.

In Fig. 6 the stationary switch members or brushes 10 are open and the coils are isolated from each other and from the line, and the running switch members or brushes 11 are closed for the normal running of the motor.

The same principle is followed in the scheme of connections illustrating both the two coil transformer and the three coil transformer. Instead of, as heretofore, connecting ends of the transformer coils permanently together at the transformer to form the desired open delta or Y connection, said ends of the coil are extended to the motor starting switch and are adapted to be connected or joined together by the switch when the switch is operated for the starting of the motor. When the switch is thrown to the running side, the junction between the transformer coils is arranged to be broken thus destroying the open delta or Y connection and, at the same time, the ends of the transformer coils which have been previously connected to the line, are now disconnected from it, thus de-energizing the transformer.

Figure 7:
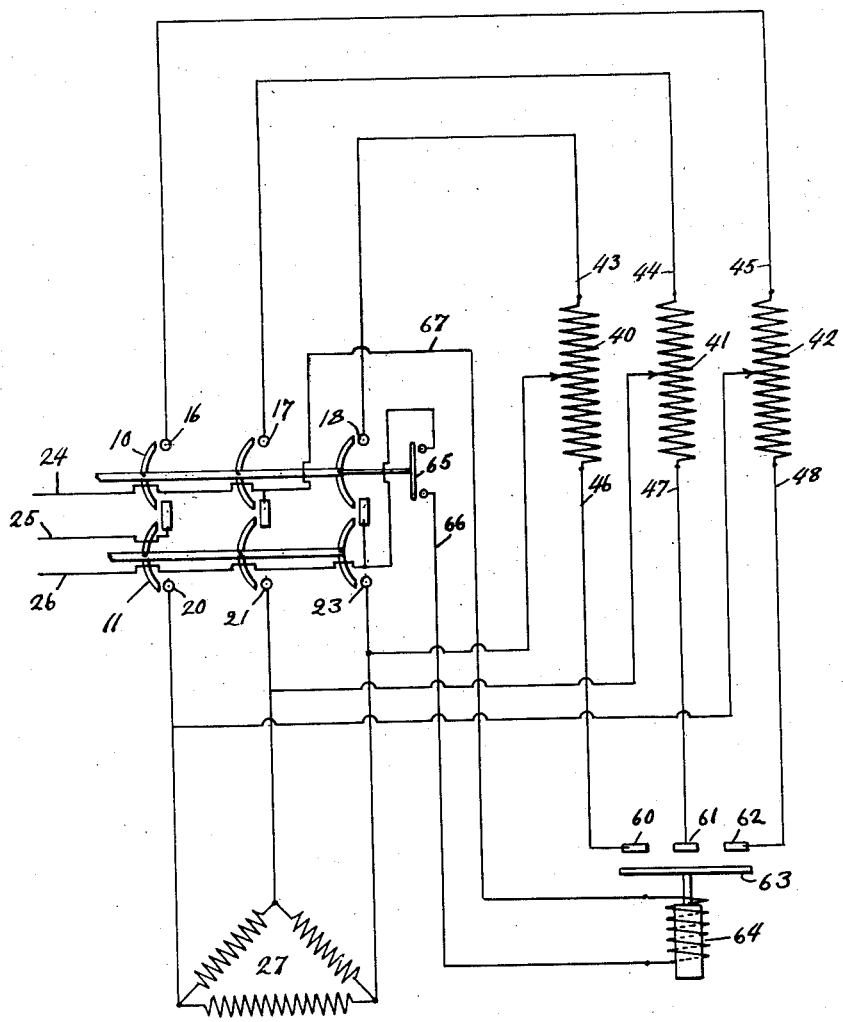
Fig. 7 is a modified arrangement of the connections shown in Fig. 2.

A modified arrangement of starting switch and auto-transformer, incorporating the features of my inventions, is illustrated in Fig. 7. This arrangement is quite similar to that shown in Fig. 2, inasmuch as a three coil transformer is employed. In place of the standard four pole switch shown in said Fig. 2, a standard three pole switch is here employed.

Connections between the switch, the transformer and the motor are made as before with the change that the ends or terminals 46, 47, and 48 of the three transformer coils are extended to three contact blocks 60, 61 and 62 of a relay or contactor having a movable element 63 adapted to bridge and electrically connect said blocks upon the energization of its coil 64 to thereby connect the transformer coils in Y.

The energization of the coil 64 of the contactor is controlled by an auxiliary switch 65 associated with the starting switch members, which may control the contactor circuit through one of the leads 66 extending from a line wire 26 to the coil 64, the lead 67 from the other end of the coil being directly connected to another line wire, as 24.

In operation, the switch 65 is, preferably, adapted to close before the main starting switch members or brushes 10 and thereby the contactor is energized and has bridged and connected the contact blocks 60, 61 and 62 before the main switch members have closed. With such an arrangement the contactor is not required to complete the circuit.

Upon opening the starting switch, or moving the switch from the starting side to the running side, said auxiliary switch 65 is designed to open after the starting switch members or brushes 10 and therefore the transformer circuit is already opened when the contactor is de-energized to disconnect the contact blocks and therefore the contactor does not interrupt the circuit.

By the early closing and delayed opening of the auxiliary switch 65, all the work of interrupting the transformer circuit is performed by the starting switch members or brushes 10 which are designed for this purpose and the contactor does no work and consequently the contact members thereof may last indefinitely.

The auxiliary switch 65 is here shown diagrammatically and in practice a standard type of switch is employed which is adapted to be operated from any convenient component of the operating mechanism of the starting switch.

The contactor is also shown diagrammatically and it is obvious that its construction may be considerably modified and the particular manner in which it operates to connect or join the ends of the transformer to form the Y (or delta) scheme of connections may be also considerably modified and yet be within the scope of invention.

With the arrangement of connections shown in Fig. 7, the starting switch may be a standard three pole switch in place of the four pole switch required in the connections shown in the previous figures, thus considerably reducing the cost of the starting switch, and the small auxiliary switch 65 may also be a standard switch.

I claim:—

1. Starting apparatus for three-phase induction motors comprising a starting transformer having normally open-ended coils, permanent connections between the motor and intermediate points of the transformer coils, a double-throw switch having stationary switch members grouped into starting and running sets, and a starting and a running set of movable brush members, said running set of brush members arranged to be actuated to connect the motor directly to a supply line for the running of the motor, and said starting set of movable brush members arranged to be actuated to connect the transformer to the supply line, and a pair of stationary switch members and a cooperating brush member arranged to be operated with said starting set of brush members to inter-connect the transformer coils and complete the circuit through the transformer for the starting of the motor.

2. A starting device for three-phase induction motors comprising a four-pole, double-throw electric switch including a set of stationary switch members on the starting side of the switch, a second set of stationary switch members on the running side of the switch, a starting and a running set of movable brush members cooperating with said sets of stationary switch members, and a flexible jumper electrically connecting a brush member of the starting set of brush members with a stationary switch member of the running set of stationary switch members.

3. A starting device for three-phase electric motors comprising a starting transformer having normally open ended coils, a four pole-double throw electric switch, and connections between said switch, transformer and the motor which admits of alternately connecting the motor through the transformer to the line and interconnecting the coils of the transformer, and connecting the motor directly to the line and breaking the connection between the coils of the transformer.

4. A motor starting device comprising a starting transformer having a plurality of normally relatively unconnected coils, a switch to connect the motor directly to the line, a contactor to interconnect said coils, and means controlled by said switch to govern the operation of the contactor.

5. A motor starting device comprising a starting transformer having a plurality of normally unconnected coils, a switch to alternately connect the motor directly to the line, and through the transformer to the line, a contactor to interconnect the transformer coils, and an auxiliary switch controlled by aforesaid switch to govern the operation of the contactor.

6. A motor starting device comprising a starting transformer having three normally unconnected coils, a switch to alternately connect the motor directly to the line, and through the transformer to the line, a contactor comprising three contact blocks each independently connected to an end of said transformer coils, a bridging member adapted to bridge and connect said contact blocks thereby to interconnect the coils of said transformer, and means controlled by said switch to control the operation of said contactor.

7. A motor starting device including a manually operable switch movable into a starting position for the starting of the motor and movable into a running position for the running of the motor, an auxiliary switch controlled by the aforesaid switch, a motor-starting transformer having normally open-ended coils, and an electrically controlled contactor controlled by said auxiliary switch to interconnect said normally open-ended coils for the starting of the motor.

8. A motor starting device including a starting transformer having normally unconnected coils, a starting switch, and an auxiliary switch cooperating with and controlled by said starting switch, said switches arranged to interconnect said transformer coils and connect the motor through the transformer to a line for the starting thereof.

In testimony whereof, I have signed my name to this specification, in the presence of two subscribing witnesses.

GEORGE A. BURNHAM.

Witnesses:
T. T. GREENWOOD,
H. B. DAVIS.